(12) United States Patent
Takatani et al.

(10) Patent No.: US 7,233,484 B2
(45) Date of Patent: Jun. 19, 2007

(54) SOLID ELECTROLYTIC CAPACITOR AND MANUFACTURING METHOD THEREOF

(75) Inventors: Kazuhiro Takatani, Takatsuki (JP); Takahisa Iida, Hirakata (JP); Mamoru Kimoto, Hirakata (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 11/344,341

(22) Filed: Feb. 1, 2006

(65) Prior Publication Data

US 2006/0221554 A1    Oct. 5, 2006

(30) Foreign Application Priority Data

Mar. 29, 2005   (JP)   ............................. 2005-096533

(51) Int. Cl.
*H01G 9/02* (2006.01)
*H01G 9/00* (2006.01)

(52) U.S. Cl. ..................... 361/525; 252/62.2; 29/25.03

(58) Field of Classification Search ........ 361/523–527, 361/528; 29/25.03; 252/62.2
See application file for complete search history.

(56) References Cited

U.S. PATENT DOCUMENTS

| 4,780,796 A | 10/1988 | Fukuda et al. |
| 4,943,892 A | 7/1990 | Tsuchiya et al. |
| 6,771,488 B2 * | 8/2004 | Takagi et al. ................ 361/523 |
| 7,144,432 B2 * | 12/2006 | Nakamura .................. 29/25.03 |

FOREIGN PATENT DOCUMENTS

| JP | 63-173313 | 7/1988 |
| JP | 1-253226 | 10/1989 |

* cited by examiner

*Primary Examiner*—Eric W. Thomas
(74) *Attorney, Agent, or Firm*—Westerman, Hattori, Daniels & Adrian, LLP.

(57) ABSTRACT

In this solid electrolytic capacitor, a plate-shaped anode having a porous sintered body is formed covering one part of an anode lead. A dielectric layer is formed covering the anode. An electrolyte layer of tantalum carbide is formed covering the dielectric layer. A cathode is formed covering the electrolyte layer. A conductive adhesive layer is formed on the upper surface of the cathode, and the cathode and a cathode terminal are connected by the conductive adhesive layer. An anode terminal is connected by welding the anode terminal on the anode lead projecting from the anode. Further, a mold outer resin is formed around the second conductive layer, the cathode terminal and the anode terminal.

13 Claims, 1 Drawing Sheet

SOLID ELECTROLYTIC CAPACITOR AND MANUFACTURING METHOD THEREOF

RELATED APPLICATION

The priority application number Japanese patent application No. 2005-96533 upon which this patent application is based is hereby incorporated by reference.

BACKGROUND OF THE INVENTION

1. Field of the Invention

The present invention relates to a solid electrolytic capacitor and a method of manufacturing the same.

2. Description of the Background Art

Recently, it has been desired to develop a solid electrolytic capacitor having a smaller value of equivalent serial resistance (hereinafter referred to as ESR) in a high frequency region. In the conventional solid electrolytic capacitor, a dielectric layer is formed covering an anode made up of a valve metal such as tantalum by anodic oxidization. Then a cathode is formed covering the dielectric layer.

In order to reduce ESR in a high frequency region, the conventional solid electrolytic capacitor has an electrolyte layer containing manganese oxide or conductive polymer with low resistivity between the dielectric layer and the cathode, (see, for example, JP-63-173313-A and JP-1-253226-A).

However, the conductivity of manganese oxide and conductive polymer are low, such as about $10^{-1}$ S/cm and about 10 S/cm to about $10^2$ S/cm respectively. There has remained a problem that an ESR sufficiently low is not obtained in the aforementioned conventional solid electrolytic capacitor.

SUMMARY OF THE INVENTION

An object of the present invention is to provide a solid electrolytic capacitor with low equivalent serial resistance.

Another object of the present invention is to provide a method of manufacturing a solid electrolytic capacitor with low equivalent serial resistance.

According to a first aspect of the present invention, a solid electrolytic capacitor has an anode containing a metal and a dielectric layer containing the oxide of the metal formed on the anode. The capacitor also has an electrolyte layer containing metal carbide having an interstitial structure formed on the dielectric layer and a cathode formed on the electrolyte layer. In the present invention, "metal carbide having the interstitial structure" means metal carbide in which carbon atoms are disposed in the crystal lattice of the metal.

In the solid electrolytic capacitor according to the first aspect, the electrolyte layer containing metal carbide having the interstitial structure is formed. Metal carbide having the interstitial structure has high conductivity on the order of $10^4$ S/cm, good adhesion property to metal oxide as a material of the dielectric layer and chemical stability. Thus, the contact resistance between the electrolyte layer and the cathode is reduced. Consequently, the solid electrolytic capacitor with low ESR in a high frequency region is obtained.

When the electrolyte layer becomes thinner, the aforementioned effect of improving the contact resistance becomes smaller. When the electrolyte layer becomes thicker, ESR becomes larger in the opposite direction. Thus, the thickness of the electrolyte layer is preferably in the range of about 20 nm to about 80 nm.

The valve metal such as tantalum, aluminum, niobium or titanium is preferably used as the metal to form the anode. According to this structure, the dielectric layer containing the oxide of the valve metal is easily obtained by anodically oxidizing the anode containing the valve metal.

In the solid electrolytic capacitor according to the first aspect, the metal carbide preferably includes at least one selected from the group containing tantalum carbide, niobium carbide, titanium carbide, zirconium carbide, hafnium carbide and vanadium carbide. According to this structure, adhesion to the dielectric layer is further improved. Thus, the solid electrolytic capacitor with lower ESR is obtained.

In a method of manufacturing a solid electrolytic capacitor according to a second aspect of the present invention, a dielectric layer containing an oxide of a metal is formed on an anode containing the metal. After the dielectric layer is immersed in a solution containing organometallic complex with a ligand, the dielectric layer is given heat treatment. Then, an electrolyte layer containing metal carbide is formed on the dielectric layer. Further, a cathode is formed on the electrolyte layer.

In the method of manufacturing a solid electrolytic capacitor according to the second aspect, the dielectric layer is given heat treatment after the dielectric layer is immersed in the solution containing organometallic complex as described above. Thus, organometallic complex adhering on the surface of the dielectric layer is decomposed. Then, the electrolyte layer containing metal carbide having an interstitial structure is easily formed on the dielectric layer. Metal carbide having the interstitial structure has high conductivity on the order of $10^4$ S/cm, good adhesion property to metal oxide as a material of the dielectric layer and chemical stability. Thus, the contact resistance between the electrolyte layer and the cathode is reliably reduced. Consequently, the solid electrolytic capacitor with low ESR in a high frequency region is easily obtained.

In this case, the dielectric layer is immersed in the solution containing organometallic complex, so that organometallic complex is adhered uniformly on the surface of the dielectric layer. Then, the electrolyte layer containing metal carbide having the interstitial structure is formed uniformly covering the dielectric layer. Further, the dielectric layer is immersed in the solution and given heat treatment repeatedly, so that the thickness of the electrolyte layer is controllable.

In the method of manufacturing the solid electrolytic capacitor according to the second aspect, the organometallic complex includes at least one kind of the ligand selected from the group containing porphyrin, phthalocyanine and ethylenediaminetetraacetic acid. According to this structure, the solid electrolytic capacitor with low ESR is further easily obtained.

DETAILED DESCRIPTION OF THE INVENTION

Figure 1:
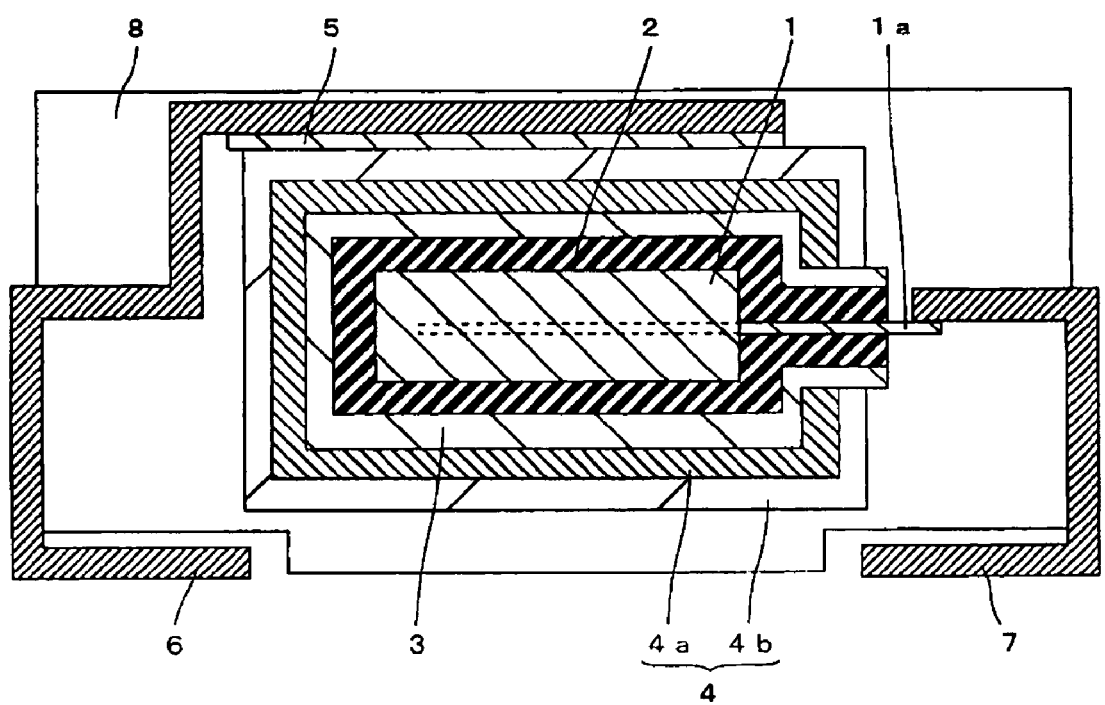
FIG. 1 is a sectional view showing a solid electrolytic capacitor according to example 1 of the present invention.

Examples of the present invention are now described with reference to the drawing.

EXAMPLE 1

A structure of a solid electrolytic capacitor according to example 1 of the present invention is now described with reference to FIG. 1.

First, in the solid electrolytic capacitor according to example 1 of the present invention, a plate-shaped anode 1 is formed covering one part of an anode lead 1a of tantalum, as shown in FIG. 1. Anode 1 has a porous sintered body of tantalum prepared by sintering tantalum particles having an average particle diameter of about 2 μm in a vacuum. Tantalum is an example of the "metal" forming the anode in the present invention.

A dielectric layer 2 of tantalum oxide is formed covering anode 1. An electrolyte layer 3 of tantalum carbide is formed covering dielectric layer 2. Tantalum carbide is an example of the "metal carbide having the interstitial structure" in the present invention.

A cathode 4 is formed covering electrolyte layer 3. Cathode 4 is formed by a first conductive layer 4a mainly containing graphite particles formed covering electrolyte layer 3 and a second conductive layer 4b mainly containing silver particles formed covering first conductive layer 4a. First conductive layer 4a and second conductive layer 44b may include polyethyleneimine as a protective colloid. The "protective colloid" herein represents a hydrophilic colloid to be added in order to increase the stability of a hydrophobic colloid for the electrolyte (Rikagaku Jiten, 5th ed.: Iwanami, p.1300).

A conductive adhesive layer 5 is formed on the upper surface of cathode 4, and cathode 4 and a cathode terminal 6 are connected by conductive adhesive layer 5. An anode terminal 7 is connected by welding anode terminal 7 on anode lead 1a projecting from anode 1. Further, a mold outer resin 8 is formed around second conductive layer 4b, cathode terminal 6 and anode terminal 7 to allow one end of cathode terminal 6 and that of anode terminal 7 to project therefrom. Thus, the solid electrolytic capacitor according to example 1 of the present invention is formed.

A process of manufacturing a solid electrolytic capacitor according to example 1 of the present invention shown in FIG. 1 is described below.

First, tantalum particles having an average particle diameter of about 2 μm are molded in a plate-shape covering one part of an anode lead 1a of tantalum. Then, an anode 1 is formed by sintering tantalum particles in a vacuum.

Anode 1 is anodized at the constant voltage of about 8 V in an aqueous solution of about 0.1 wt % phosphoric acid kept at about 60 degree C. for about 10 hours. Thus, a dielectric layer 2 of tantalum oxide is formed covering anode 1.

Anode 1 formed with dielectric layer 2 is immersed in ethanol of about 1 wt % tantalum complex with porphyrin ($C_{20}H_{14}N_4$) as a ligand, so that tantalum complex is adhered uniformly on the surface of dielectric layer 2. Tantalum complex with porphyrin as the ligand is an example of the "organometallic complex" in the present invention.

Then, anode 1 formed with dielectric layer 2 is given heat treatment at about 150 degree C. for about 1 hour, so that tantalum complex is decomposed. An electrolyte layer 3 of tantalum carbide is formed uniformly on the surface of dielectric layer 2.

Graphite paste containing graphite particles, polyethyleneimine as the protective colloid and ethanol as an organic solvent is applied on electrolyte layer 3 and then dried at about 80 degree C. for about 30 minutes. Thus, a first conductive layer 4a mainly containing graphite particles is formed. Silver paste containing silver particles, polyethyleneimine as the protective colloid and ethanol as the organic solvent is then applied covering first conductive layer 4a and is then dried at about 170 degree C. for about 30 minutes. Thus, a second conductive layer 4b mainly containing silver particles is formed and a cathode 4 laminated from first conductive layer 4a and second conductive layer 4b is formed covering electrolyte layer 3.

After a conductive adhesive agent is applied on a cathode terminal 6, cathode 4 and cathode terminal 6 are joined by this conductive adhesive agent. The conductive adhesive agent is dried at about 60 degree C. for about 30 minutes under pressure between cathode 4 and cathode terminal 6. Thus, a conductive adhesive layer 5 connecting cathode 4 and cathode terminal 6 is formed.

After that, an anode terminal 7 is connected by welding anode terminal 7 on anode lead 1a and a mold outer resin 8 is formed to allow one end of cathode terminal 6 and that of anode terminal 7 to project therefrom. Thus, a solid electrolytic capacitor according to example 1 of the present invention is fabricated.

COMPARATIVE EXAMPLE 1

As the comparative example 1 solid electrolytic capacitor having the same structure as that in example 1 is fabricated except that the electrolyte layer of polypyrrole is formed by polymerization instead of the electrolyte layer 3 of tantalum carbide in the aforementioned example 1.

EXAMPLE 2

In this example 2, solid electrolytic capacitors having the same structure as that in example 1 are fabricated except that electrolyte layers 3 are formed of niobium carbide, titanium carbide, zirconium carbide, hafnium carbide, vanadium carbide and tungsten carbide instead of electrolyte layer 3 of tantalum carbide in the aforementioned example 1. Niobium carbide, titanium carbide, zirconium carbide, hafnium carbide, vanadium carbide and tungsten carbide are examples of the "metal carbide having the interstitial structure" in the present invention respectively.

In this example, electrolyte layers 3 are formed in the same manner as in example 1 except that ethanol of about 1 wt % niobium complex, titanium complex, zirconium complex, hafnium complex, vanadium complex and tungsten complex with porphyrin as ligands are used respectively. Niobium complex, titanium complex, zirconium complex, hafnium complex, vanadium complex and tungsten complex are examples of the "organometallic complex" in the present invention respectively.

The solid electrolytic capacitors formed in examples 1 and 2 and the comparative example 1 are measured for ESR at a frequency of about 100 kHz using an LCR meter by means of applying voltage between cathode terminal 6 and anode terminal 7. The results are shown in Table 1.

TABLE 1

|  | Electrolyte layer | ESR |
| --- | --- | --- |
| Example 1 | Tantalum carbide | 15.1 mΩ |
| Example 2 | Niobium carbide | 14.6 mΩ |
|  | Titanium carbide | 15.3 mΩ |
|  | Zirconium carbide | 14.9 mΩ |
|  | Hafnium carbide | 15.6 mΩ |
|  | Vanadium carbide | 15.2 mΩ |

TABLE 1-continued

| | Electrolyte layer | ESR |
|---|---|---|
| | Tungsten carbide | 17.1 mΩ |
| Comparative example 1 | Polypyrrole | 21.0 mΩ |

ESR in the solid electrolytic capacitors of examples 1 and 2 are reduced as compared with ESR in the solid electrolytic capacitor of the comparative example 1, as shown in Table 1. Electrolyte layers 3 in examples 1 and 2 are made up of the metal carbides having the interstitial structure in all cases. Thus, it becomes clear that ESR is reduced effectively by means of forming electrolyte layer 3 of the metal carbide having the interstitial structure between dielectric layer 2 and cathode 4.

It is also discovered that ESR becomes less in the cases of electrolyte layers 3 of tantalum carbide, niobium carbide, titanium carbide, zirconium carbide, hafnium carbide and vanadium carbide. Concerning conductivities of metallic carbides forming electrolyte layers 3, conductivities of tantalum carbide (about $3.3 \times 10^4$ S/cm) and zirconium carbide (about $2.5 \times 10^4$ S/cm) are larger than that of tungsten carbide (about $1.9 \times 10^4$ S/cm) respectively. Further, conductivities of niobium carbide (about $1.4 \times 10^4$ S/cm), hafnium carbide (about $9.2 \times 10^3$ S/cm), titanium carbide (about $5.6 \times 10^3$ S/cm) and vanadium carbide (about $6.7 \times 10^3$ S/cm) are smaller than that of tungsten carbide respectively. Thus, the reduction of ESR may be effected by not only conductivity of electrolyte layers 3 but also the adhesion property.

EXAMPLE 3

Solid electrolytic capacitors are fabricated in the same manner as in example 1 except that ethanol containing tantalum complexes with phthalocyanine ($C_{32}H_{16}N_8$), ethylenediaminetetraacetic ($C_{10}H_{16}N_2O_8$, EDTA) and citric acid ($C_6H_{10}O_8$) as ligands are used instead of ethanol containing tantalum complex with porphyrin as a ligand in example 1 respectively.

The solid electrolytic capacitors formed in this example are measured for ESR at a frequency of about 100 kHz using an LCR meter by means of applying voltage between cathode terminal 6 and anode terminal 7. The results are shown in Table 2.

TABLE 2

| | Ligand | ESR |
|---|---|---|
| Example 1 | Porphyrin | 15.1 mΩ |
| Example 3 | Phthalocyanine | 15.2 mΩ |
| | EDTA | 15.5 mΩ |
| | Citric acid | 18.0 mΩ |
| Comparative example 1 | — | 21.0 mΩ |

ESR in the solid electrolytic capacitors of example 3 is less than ESR in the solid electrolytic capacitor of the comparative example 1, as shown in Table 2. Especially, ESR become less in the case of ligands of organometallic complexes are made up of porphyrin, phthalocyanine and EDTA respectively.

In examples 1 to 3, dielectric layers 2 are immersed in solutions containing organometallic complexes when electrolyte layers 3 are formed. Thus organometallic complexes are adhered approximately uniformly on the surface of dielectric layers 2. Consequently, electrolyte layers 3 of metal carbide having the interstitial structure are formed covering dielectric layers 2. Dielectric layer 2 is immersed in the aforementioned solutions and given heat treatment repeatedly, so that the thickness of electrolyte layer 3 is controllable.

In examples 1 to 3, anodes 1 made up of the porous sintered body are used. Thus, the contact area increases between dielectric layer 2 and electrolyte layer 3 and minute rugged shapes are formed on electrolyte layer 3, so that the adhesion property between dielectric layer 2 and electrolyte layer 3 is improved. Consequently, ESR is further reduced.

In examples 1 to 3, anodes 1 made up of tantalum as the valve metal are used. Thus, dielectric layer 2 of tantalum oxide is easily obtained by anodically oxidizing anode 1.

Although the present invention has been described and illustrated in detail, it is clearly understood that the same is by way of illustration and example only and is not to be taken by way of limitation, the spirit and scope of the present invention being limited only by the terms of the appended claims.

For example, while electrolyte layers 3 are made up of carbide of one metal in each of the aforementioned examples, the present invention is not restricted to these but electrolyte layers 3 may be made up of carbides of two or more metals. When the aforementioned electrolyte layer 3 of carbides of two or more metals is formed, a solution containing two or more organometallic complexes is preferably used. After two or more solutions containing different organometallic complexes are prepared, these organometallic complexes may be adhered on dielectric layers 2 and thermally decomposed respectively.

While electrolyte layers 3 are formed by immersing dielectric layers 2 in solutions containing organometallic complex in each of the aforementioned examples, the present invention is not restricted to these but electrolyte layers 3 may be formed by adhering organometallic complex on the surface of dielectric layer 2 by means of spraying or the like.

While ethanol is used as a solvent containing organometallic complexes in each of the aforementioned examples, the present invention is not restricted to this but another organic solvent such as ethylene glycol, acetone or the like may be used.

While first conductive layers 4a contain graphite particles in each of the aforementioned examples, the present invention is not restricted to this but first conductive layer 4a may contain other carbon particles than graphite particles.

While anodes 1 are made up of tantalum in each of the aforementioned examples, the present invention is not restricted to this but anode 1 may be made up of another kind of a valve metal such as aluminum, niobium or titanium. Anode 1 may be made up of an alloy containing the valve metal.

While the aqueous solutions of phosphoric acid are used for anodic oxidation of anodes 1 in each of the aforementioned examples, the present invention is not restricted to this but aqueous solutions containing fluorine such as ammonium fluoride, potassium fluoride, sodium fluoride and fluoric acid, and phosphate solution may be used.

While anodes 1 have a plate-shaped body in each of the aforementioned examples, the present invention is not restricted to this but anode 1 may have a sheet-shaped body or a foil-shaped body.

What is claimed is:

1. A solid electrolytic capacitor, comprising:
   an anode containing a metal;
   a dielectric layer containing an oxide of said metal formed on said anode;
   an electrolyte layer containing metal carbide having an interstitial structure and being formed on said dielectric layer; and
   a cathode formed on said electrolyte layer.

2. The solid electrolytic capacitor according to claim 1, wherein
   said metal carbide includes at least one selected from the group consisting of tantalum carbide, niobium carbide, titanium carbide, zirconium carbide, hafnium carbide and vanadium carbide.

3. The solid electrolytic capacitor according to claim 1, wherein
   said metal carbide contains tantalum carbide.

4. The solid electrolytic capacitor according to claim 1, wherein
   said metal carbide contains niobium carbide.

5. The solid electrolytic capacitor according to claim 1, wherein
   said metal carbide contains titanium carbide.

6. The solid electrolytic capacitor according to claim 1, wherein
   said metal carbide contains zirconium carbide.

7. The solid electrolytic capacitor according to claim 1, wherein
   said metal carbide contains hafnium carbide.

8. The solid electrolytic capacitor according to claim 1, wherein
   said metal carbide contains vanadium carbide.

9. A method of manufacturing a solid electrolytic capacitor, comprising the steps of:
   forming a dielectric layer containing an oxide of a metal on an anode containing said metal;
   immersing said dielectric layer in a solution containing organometallic complex with a ligand, thereafter forming an electrolyte layer containing metal carbide on said dielectric layer by heat treatment, and
   forming a cathode on said electrolyte layer.

10. The method of manufacturing a solid electrolytic capacitor according to claim 9, wherein
    said organometallic complex includes at least one kind of said ligand selected from the group consisting of porphyrin, phthalocyanine and ethylenediaminetetraacetic acid.

11. The method of manufacturing a solid electrolytic capacitor according to claim 9, wherein
    said organometallic complex contains said ligand of porphyrin.

12. The method of manufacturing a solid electrolytic capacitor according to claim 9, wherein
    said organometallic complex contains said ligand of phthalocyanine.

13. The method of manufacturing a solid electrolytic capacitor according to claim 9, wherein
    said organometallic complex contains said ligand of ethylenediaminetetraacetic acid.

* * * * *